US009969503B2

(12) United States Patent
Noice

(10) Patent No.: US 9,969,503 B2
(45) Date of Patent: May 15, 2018

(54) HEAD-UP DISPLAY (HUD) STALL RECOVERY SYMBOLOGY

(71) Applicant: Rockwell Collins, Inc., Cedar Rapids, IA (US)

(72) Inventor: Lenard E. Noice, West Line, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 101 days.

(21) Appl. No.: 15/215,963

(22) Filed: Jul. 21, 2016

(65) Prior Publication Data
US 2018/0022469 A1    Jan. 25, 2018

(51) Int. Cl.
*B64D 43/02* (2006.01)
*G06F 3/16* (2006.01)
*G09G 5/00* (2006.01)
*G06F 3/0481* (2013.01)

(52) U.S. Cl.
CPC .......... *B64D 43/02* (2013.01); *G06F 3/0481* (2013.01); *G06F 3/16* (2013.01); *G09G 5/003* (2013.01); *G09G 2380/12* (2013.01)

(58) Field of Classification Search
CPC .... B64D 43/02; B64D 45/00; B64D 45/0005; G01C 23/005; G01C 23/00; B64C 13/16; B64F 5/60; F01D 21/003; G01P 13/025; G01S 7/22; G01S 7/24; G05D 1/0607
See application file for complete search history.

(56) References Cited

U.S. PATENT DOCUMENTS

| 3,630,169 | A | * | 12/1971 | Corey | B64D 43/02 116/265 |
| 3,686,936 | A | * | 8/1972 | Daudt, Jr. | B64D 43/02 340/966 |
| 4,040,005 | A | * | 8/1977 | Melvin | G01C 23/005 244/181 |
| 4,786,905 | A | * | 11/1988 | Muller | G01C 23/005 33/328 |

(Continued)

OTHER PUBLICATIONS

John S. Duncan; "Advisory Circular; Subject: Stall Prevention and Recovery Training"; U.S. Department of Transportation, Federal Aviation Administration; AC No. 120-109A; Initiated by: AFS-200; Nov. 24, 2015; 35 pages.

*Primary Examiner* — Fekadeselassie Girma
(74) *Attorney, Agent, or Firm* — Angel N. Gerdzhikov; Donna P. Suchy; Daniel M. Barbieri

(57) ABSTRACT

A system and related methods for providing stall recovery guidance symbology via a head-up display (HUD) or similar avionics display element detects stall or near-stall conditions and provides symbology to guide the pilot through recovering from the stall by prioritizing pitch correction and disengagement of the autopilot system. Pitch correction symbology guides the pilot toward reducing the aircraft angle of attack and establishing level flight, while thrust recovery symbology helps the pilot control the application of thrust to avoid prolonging or reinstituting the stall. The system modifies the stall recovery symbology in response to detected changes in pitch, angle of attack, or airspeed. Once level flight has been established and stall conditions are no longer present, the system may transition out of stall recovery mode to regular inflight symbology.

20 Claims, 6 Drawing Sheets

(56) References Cited

U.S. PATENT DOCUMENTS

| | | | | |
|---|---|---|---|---|
| 4,908,619 | A * | 3/1990 | Bala | G05D 1/0607 244/187 |
| 4,910,513 | A * | 3/1990 | Kelly | G01C 23/005 340/966 |
| 5,057,832 | A * | 10/1991 | England | G08B 3/00 116/62.3 |
| 5,248,968 | A * | 9/1993 | Kelly | G01C 23/005 340/961 |
| 5,272,906 | A * | 12/1993 | Bowers, Jr. | B64F 5/60 340/515 |
| 5,341,677 | A * | 8/1994 | Maris | G01M 9/065 340/966 |
| 5,595,357 | A * | 1/1997 | Catlin | B64D 43/02 244/1 R |
| 6,169,496 | B1 * | 1/2001 | Martin | G05D 1/0072 244/179 |
| 6,567,014 | B1 | 5/2003 | Hansen et al. | |
| 6,573,841 | B2 * | 6/2003 | Price | G01C 23/00 340/963 |
| 6,985,091 | B2 * | 1/2006 | Price | G01C 23/005 340/966 |
| 7,403,133 | B2 * | 7/2008 | He | G01C 23/00 340/974 |
| 7,418,318 | B2 * | 8/2008 | Hrabak | G01C 23/00 340/945 |
| 8,620,495 | B2 * | 12/2013 | Alwin | B64C 13/16 244/134 R |
| 8,958,930 | B2 * | 2/2015 | Malta | B64C 5/02 244/75.1 |
| 8,965,603 | B2 * | 2/2015 | Baillon | B64D 45/0005 701/14 |
| 9,221,550 | B2 * | 12/2015 | Hedrick | B64D 43/02 |
| 9,254,926 | B2 * | 2/2016 | Maeda | B64D 43/02 |
| 9,849,999 | B1 * | 12/2017 | Fymat | B64D 45/00 |
| 2003/0132860 | A1 * | 7/2003 | Feyereisen | G01C 23/00 340/973 |
| 2003/0225492 | A1 * | 12/2003 | Cope | G07C 5/008 701/33.4 |
| 2003/0229426 | A1 * | 12/2003 | Griffin, III | G01C 23/00 701/3 |
| 2006/0098042 | A1 * | 5/2006 | Silverbrook | B41J 2/145 347/40 |
| 2009/0325131 | A1 * | 12/2009 | Cernasov | G06F 3/012 434/30 |
| 2015/0084792 | A1 * | 3/2015 | Barth | B64D 43/02 340/966 |
| 2015/0100184 | A1 * | 4/2015 | Nathan | G01C 23/00 701/7 |
| 2015/0314884 | A1 * | 11/2015 | Johnson | B64D 45/00 701/14 |
| 2016/0363459 | A1 * | 12/2016 | Lissajoux | G01C 23/005 |

* cited by examiner

200

216 — Detecting, via the controller, at least one airspeed change of the aircraft 218 — In response to the detected airspeed change, modifying, via the avionics display system, the at least one fourth symbol

HEAD-UP DISPLAY (HUD) STALL RECOVERY SYMBOLOGY

BACKGROUND

Embodiments of the inventive concepts disclosed herein are directed generally to a system for providing stall recovery guidance to an aircraft pilot or crew via responsive symbology displayed via a head-down display (HUD), a head-up display (HUD), or a head-worn display (HWD).

In 2009, Air France Flight 447, an Airbus A330 out of Rio de Janeiro, crashed into the Atlantic Ocean after entering a high-altitude stall from which the aircraft never recovered. The aircraft's angle of attack (AoA) approached 40 degrees at one point and largely remained well above 30 degrees, rendering airspeed indications and stall warnings invalid. The aircraft remained in a stalled condition as it began to rapidly descend from cruising altitude, pitched upward at around 16 degrees, its engines responsive to command and continuing to develop full forward Takeoff/Go-around (TOGA) thrust until the craft struck the ocean surface.

As a result of the Air France crash, FAA training regulations were revised to include stall recovery procedures, applicable broadly to aircraft of all sizes or types and generally to any stall conditions, that prioritize the reduction of AoA above achieving maximum TOGA thrust. The stall recovery procedures provide for disengaging the aircraft autopilot or autothrottle system while maintaining altitude and preventing the aircraft pitch from changing adversely (e.g., in a nose-up direction). The pilot's priority is to reduce AoA via nose-down pitch control or stabilizer trim (if necessary) while keeping the wings level (roll control). Thrust may be adjusted accordingly as needed; maximum thrust may not always be advised as the application of maximum thrust may create a nose-up pitch moment (e.g., for aircraft with engines mounted below the wing) and exacerbate a stall condition.

Current HUD symbology may complement the situational awareness provided by the primary flight display (PFD) by offering recovery guidance under windshear or unusual-attitude conditions. Current symbology may indicate a stall or near stall condition to the pilot, but does not provide active guidance for stall recovery.

SUMMARY

In one aspect, embodiments of the inventive concepts disclosed herein are directed to a system for providing stall recovery guidance symbology via an avionics display system. The system may include a head down display (HDD), head-up display (HUD), head-mounted display (HMD), head-worn display (HWD), or other avionics display element for displaying imagery. The system may include a controller coupled to the display element and to avionics systems of the aircraft. The controller may detect a stall condition of the aircraft based on data received from the avionics systems (e.g., altitude, configuration, angle of attack). The controller may detect whether the aircraft autopilot or autothrottle is active. When a stall condition is present, the controller may generate stall recovery symbology for display by the display element. The stall recovery symbology may include an annunciator of the autopilot/autothrottle status, pitch and roll correction symbology, and thrust correction symbology.

In a further aspect, embodiments of the inventive concepts disclosed herein are directed to an avionics display system. The system may include a display element, such as a HDD, HUD, HMD, or HWD. The system may include a controller coupled to the display element and to avionics systems of the aircraft. The controller may detect a stall condition of the aircraft and whether the aircraft autopilot or autothrottle is currently active. While the stall condition is present, the controller may generate stall recovery guidance symbology for display by the display element, including an annunciator of the autopilot status (while the autopilot remains active), pitch/roll correction symbology, and thrust correction symbology, some or all of which may be accompanied by auditory alerts and guidance. The controller may detect changes to the aircraft pitch (angle of attack) or roll and modify the pitch/roll correction symbology accordingly. The controller may detect an airspeed change of the aircraft, and modify the thrust correction symbology accordingly.

In a still further aspect, embodiments of the inventive concepts disclosed herein are directed to a method for providing stall recovery guidance symbology. The method may include detecting, via an avionics system of an aircraft, a stall condition of the aircraft. The method may include determining, via the avionics system, an active status of an autopilot or autothrottle of the aircraft. The method may include, while the autopilot or autothrottle is active, displaying an annunciator corresponding to the active status via an avionics display element. The method may include displaying, via the display element, pitch or roll correction symbology. The method may include detecting, via the avionics system, a change in the aircraft pitch or roll, and modifying the pitch or roll correction symbology accordingly.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
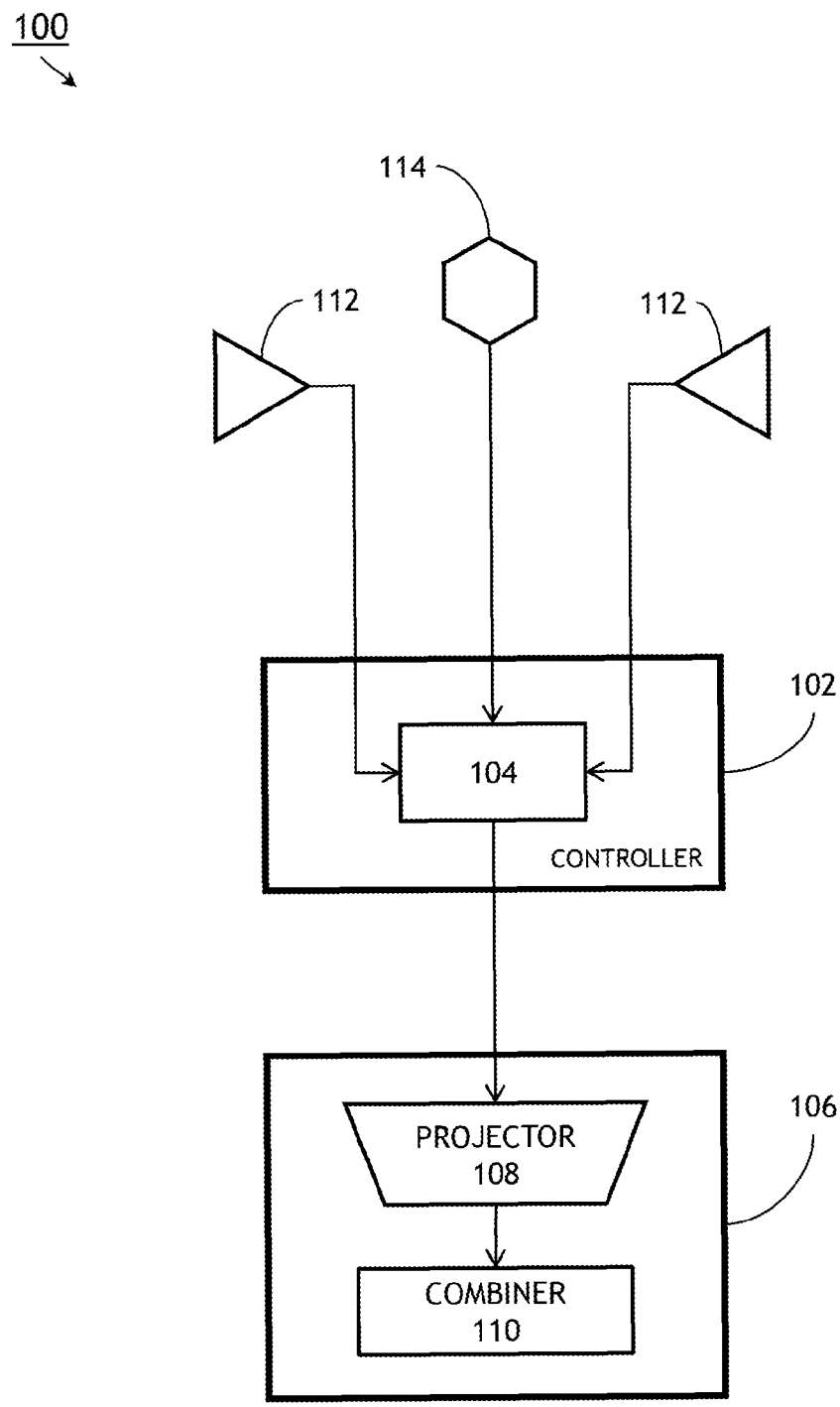
FIG. 1 is a block diagram of the components of an exemplary embodiment of a system for stall recovery guidance according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a system and related method for providing stall recovery symbology via a head-up display (HUD) or other avionics display element. When a stall is detected, the system may help the pilot quickly and intuitively recover from the stall according to FAA stall recovery guidelines. Stall recovery symbology may prevent the pilot or crew from inadvertently exacerbating the stall in their urgency to take action.

Referring to FIG. 1, an exemplary embodiment of a system 100 for providing stall recovery symbology according to the inventive concepts disclosed herein may include a controller 102 including one or more processors 104 and a display element 106 including a projector 108 or similar display module and a combiner 110 or similar display surface. The controller 110 may be connected to one or more aircraft sensors 112 or avionics systems 114 of an aircraft in which the system 100 is embodied. The display element 106 may be a primary flight display (PFD) or head-down display (HDD), a head-up display (HUD), a head-mounted display (HMD), or a head-worn display (HWD) configured to display fully or partially immersive imagery corresponding to the environment surrounding the aircraft. The display element 106 may include graphics processors (e.g., a synthetic vision system (SVS)) for generating explanatory symbology related to the environment and merging the symbology with the imagery to generate a combined vision stream displayed via the combiner 110. The processors 104 of the controller 102 may generate some or all of the symbology of a combined vision stream. Based on data collected from the aircraft sensors 112 or avionics systems 114, the controller 102 may determine that a near-stall or stall condition is present. For example, the controller 102 may be coupled to a stall warning system of the aircraft, or to external pitot tubes, vanes, or other mechanisms configured for sensing an unusual angle of attack (AoA) characteristic of a stall or near-stall condition. The controller 102 may determine that a stall or near-stall condition exists based on a combination of the AoA, the aircraft pitch, the current airspeed, or other relevant factors.

Figure 2A:
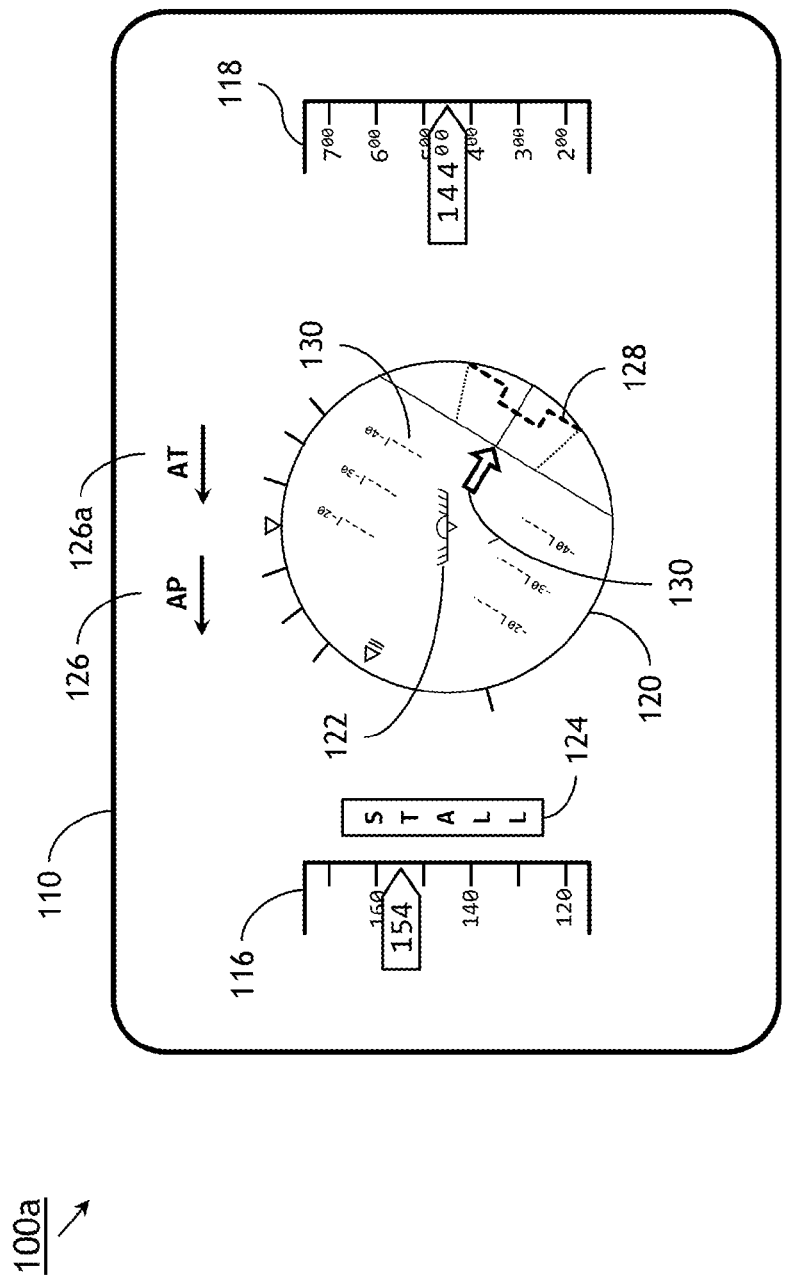
FIGS. 2A through 2C illustrate symbology displayed by the system of FIG. 1.

Referring to FIG. 2A, an exemplary embodiment of a system 100a for providing stall recovery symbology may be implemented identically to the system 100 of FIG. 1, except that when a stall or near-stall condition is detected by the controller 102 (FIG. 1), the system 100a may fade out some or all of the symbology normally displayed via the combiner 110 or display surface of the system 100a and generate stall recovery symbology. For example, the airspeed indicator 116, altitude indicator 118, artificial horizon 120, boresight symbol 122, stall warning symbol 124, or other relevant symbology (e.g., an AoA warning (not shown)) may be retained.

Furthermore, the stall warning symbol 124 may be accompanied by an auditory alert while stall conditions persist. However, the system 100a may determine if the autopilot or autothrottle system of the aircraft is activated and display an autopilot annunciator 126 to provide the pilot with immediate recognition of the autopilot active status so that the autopilot system can be disabled. The autopilot annunciator 126 may include an autothrottle annunciator 126a indicating an active autothrottle status. The system 100a may terminate the autopilot annunciator 126 or autothrottle annunciator 126a upon determination that the autopilot or autothrottle system has been disengaged. In some embodiments, an active autopilot system may execute stall recovery procedures without direct pilot input. The system 100a may continue to monitor stall recovery and update the displayed stall recovery symbology accordingly, depending on detected pitch, roll or thrust changes, until stall or near-stall conditions are no longer present.

During initial entry into the stall recovery symbology, the system 100a may generate and display a stall attitude recovery (SAR) symbol 128 indicating a target pitch attitude of the aircraft for stall recovery. When the SAR 128 is not conformal to the aircraft boresight symbol 122, the system 100a may display a stall recovery chevron (SRC) 130 which rotates above the earth frame, similarly to the aircraft pitch scales 130. The SRC 130 may indicate the desired direction of pitch correction to achieve the target pitch attitude indicated by the SAR 128. The SAR 128 may be displayed as a ghosted (dashed) symbol when not fully within the artificial horizon 120 (e.g., when the SAR 128 is partially clipped or cropped), and may rotate or move vertically relative to the earth frame, similarly to the SRC 130. As the pilot reduces the aircraft pitch or AoA, the presentation of the SAR 128 and SRC 130 may be modified to reflect changes in aircraft pitch or AoA by appearing closer to the boresight symbol 122. For example, as the SAR 128 becomes fully visible within the artificial horizon 120, the SAR may provide situational awareness of the aircraft roll orientation (in addition to that provided by the artificial horizon 120) so that the pilot may level the wings pursuant to stall recovery.

When the SAR 128 is aligned with the boresight symbol 122, the SRC 130 may be terminated to indicate pitch recovery, or the achievement of the target pitch attitude.

Figure 2B:
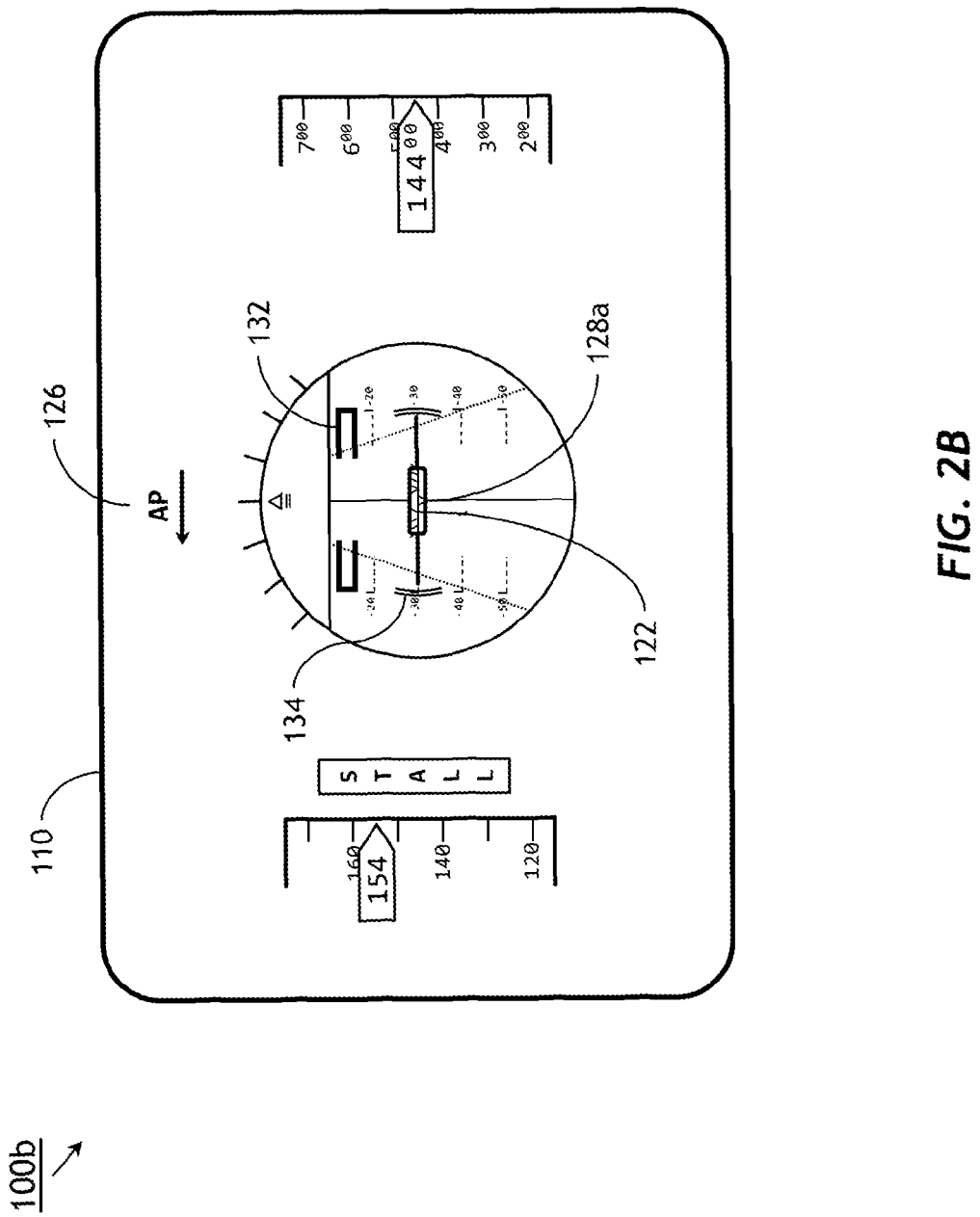

Referring now to FIG. 2B, an exemplary embodiment of a system 100b for providing stall recovery symbology may be implemented identically to the system 100a of FIG. 2A, except that when the pilot has achieved a target pitch attitude, the SRC 130 (FIG. 2A) may be terminated and the SAR (128a) displayed via the combiner 110 or display surface as a solid symbol (e.g., neither ghosted nor cropped) aligned with the aircraft boresight symbol 122. The SAR 128a may further indicate that the pilot has leveled the wings, and that the roll angle of the aircraft is therefore aligned with the horizontal (as indicated by the artificial horizon 120). Symbology displayed by the system 100b may include pitch guides 132 and roll guides 134 for establishing target pitch or roll zones for the pitch and roll attitudes of the aircraft (as portrayed by the SAR 128a). The system 100b may provide auditory guidance to the pilot in adjusting the pitch and roll attitudes of the aircraft to achieve the target pitch or roll zones indicated by the pitch guides 132 and roll guides 134. The autopilot annunciator 126 may continue to be displayed (and the corresponding auditory alert may continue to sound) if the autopilot has not been disengaged.

Figure 2C:
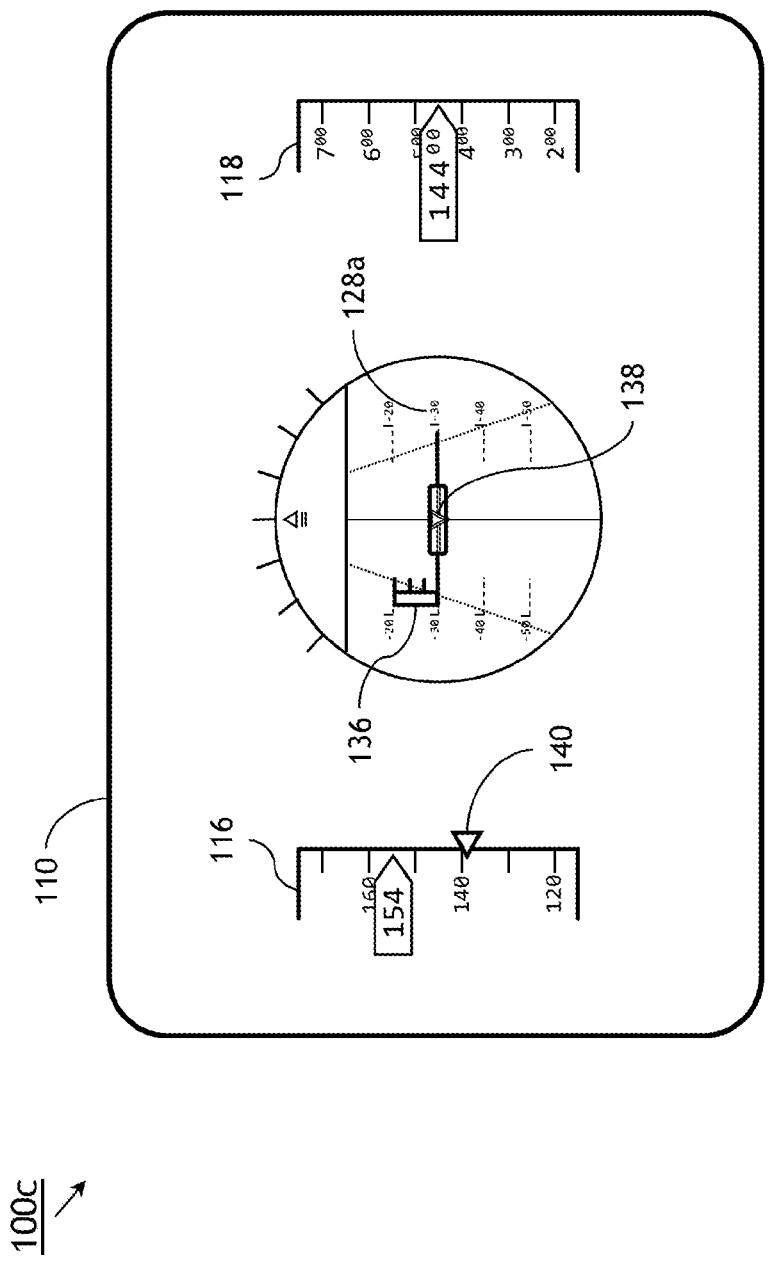

Referring to FIG. 2C, an exemplary embodiment of a system 100c for providing stall recovery symbology may be implemented identically to the system 100b of FIG. 2B, except that once the aircraft has achieved the target pitch attitude indicating a corrected AoA, the system 100c may display (via the combiner 110 (FIG. 1) or display surface) a stall thrust recovery (STR) symbol 136. The STR 136 may aid the pilot in correcting the airspeed while preventing over- or under-thrust conditions that may inhibit or counteract stall recovery. The display and modification of the STR 136 and thrust correction command may be determined algorithmically by the controller 102 (FIG. 1), based on the total lift equation $$L = C_L \rho \frac{V^2}{2} S$$

(for lift L, lift coefficient $C_L$ air density $\rho$, velocity V, and wing surface area S). The controller 102 may determine that the aircraft has achieved stable flight, e.g., that near-stall or stall conditions no longer exist. Accordingly, visible and auditory stall warnings (e.g., the stall warning symbol 124 (FIG. 2A) and corresponding alert) may be terminated by the controller 102. The system 100c may transition into the normal symbology displayed via the combiner 110 or display surface, e.g., by blending the SAR 128a into the flight path symbol 138, so the pilot does not have to scan the display surface to locate the flight path symbol. The STR 136 may be accompanied by a target airspeed guide 140, indicating a target airspeed toward which the pilot may adjust, as well as auditory guidance in adjusting airspeed to achieve the target airspeed.

Stall recovery symbology may be displayed via the combiner 110 or display surface as monochrome or colored symbols, depending on, e.g., whether the display element 106 (FIG. 1) is a PFD/HDD, HUD, HMD, or HWD. Stall recovery symbology may be further modified according to human factors considerations. For example, the stall recovery symbology may be implemented as flashing symbols, or more boldly than the airspeed indicator 116 or altitude indicator 118 to appear brighter or to be more easily identified and instantly interpreted by the pilot.

Figure 3A:
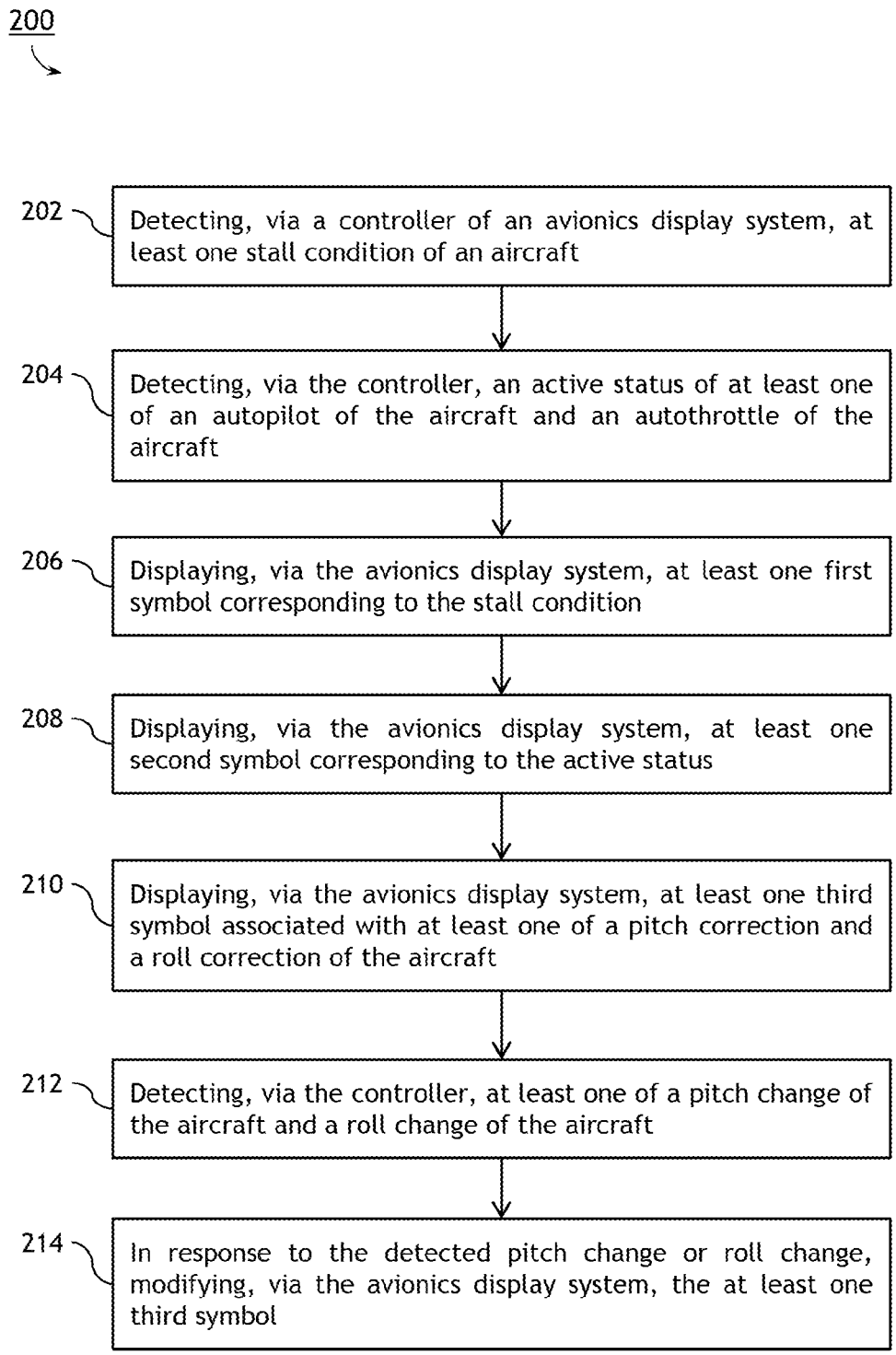
FIGS. 3A and 3B illustrate an exemplary embodiment of a method for providing stall recovery symbology according to the inventive concepts disclosed herein.

Referring now to FIG. 3A, an exemplary embodiment of a method 200 for providing stall recovery symbology according to the inventive concepts disclosed herein may be implemented by the system 100 in some embodiments, and may include one or more of the following steps. At a step 202, the controller of the display element (HDD, HUD, HMD, HWD) detects a near-stall or stall condition of the aircraft. For example, the controller may determine a stall based on the aircraft angle of attack (AoA) or based on the aircraft configuration (e.g., the detected state of aircraft flaps, gear, or other internal and external components). The controller may be coupled to a stall warning system, which may be used as a basis for determining stall or near-stall conditions.

At a step 204, the controller determines whether the aircraft autopilot or autothrottle system is active.

At a step 206, the display element displays a stall warning symbol. The stall warning may include auditory alerts or warnings generated by the display element.

At a step 208, the display element displays an annunciator corresponding to the active status of the autopilot or autothrottle.

At a step 210, the display element displays pitch correction and roll correction symbols. For example, the display element may display a SAR corresponding to a target pitch attitude associated with stall recovery, and a SRC indicating the desired direction of pitch correction for achieving the target pitch attitude. The SAR may indicate the target roll attitude as well as the target pitch attitude. The display element may display additional symbology to guide the pilot toward the target pitch and roll attitudes. The displayed symbology may be accompanied by auditory alerts.

At a step 212, the controller detects a change in the aircraft pitch attitude (AoA) or a change in the aircraft roll attitude.

At a step 214, the controller modifies the pitch correction symbology or the roll correction symbology displayed by the display element in response to the detected change in pitch attitude/AoA or the detected change in roll attitude. For example, the controller may remove the SRC if the aircraft has achieved level flight, and display stall thrust recovery symbology to provide the pilot with thrust correction guidance.

Figures 3A, 3B:

Referring now to FIG. 3B, the method 200 may include additional steps 216 and 218. At the step 216, the controller detects a change in airspeed or thrust of the aircraft.

At the step 218, the controller modifies the thrust correction symbology displayed by the display element in response to the detected change in airspeed or thrust.

As will be appreciated from the above, systems and methods according to embodiments of the inventive concepts disclosed herein may provide enhanced situational awareness and simplified guidance for quickly and efficiently taking steps to recover aircraft of all sizes and configurations from stall or near-stall conditions. Stall recovery symbology may provide pilots with clear guidance through the stall recovery process, reducing the possibility that the urgency of a stall condition may inadvertently lead to counterproductive actions.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A system for providing stall recovery symbology, comprising:
    at least one avionics display element configured to display at least one image associated with an aircraft;
    at least one controller configured to be coupled to the avionics display element and to at least one avionics system of the aircraft, the controller including at least one processor configured to:
    detect at least one stall condition of the aircraft;
    detect an active status of at least one of an autopilot of the aircraft and an autothrottle of the aircraft;
    in response to the at least one stall condition, generate one or more symbols for display by the avionics display element, the one or more symbols including at least one of:
    a) a first symbol corresponding to the stall condition;
    b) a second symbol corresponding to the active status;
    c) a third symbol associated with at least one of a pitch correction of the aircraft and a roll correction of the aircraft; and
    d) a fourth symbol associated with a thrust correction of the aircraft;
    detect at least one of a pitch change of the aircraft and a roll change of the aircraft; and
    in response to the detected pitch change or roll change, modify the at least one second symbol.

2. The system of claim 1, wherein the avionics display element is configured to generate at least one auditory alert associated with the at least one stall condition.

3. The system of claim 1, wherein the at least one third symbol includes at least one of:
    a fifth symbol corresponding to at least one of a desired pitch of the aircraft and a desired roll of the aircraft; and
    a sixth symbol indicating at least one of a pitch correction for achieving the desired pitch and a roll correction for achieving the desired roll.

4. The system of claim 3, wherein the at least one fifth symbol includes at least one of a limited symbol, a ghosted symbol, and a dashed symbol.

5. The system of claim 3, wherein the controller is configured to:
    detect an achievement by the aircraft of at least one of the desired pitch and the desired roll; and
    in response to the detected achievement, display one or more of the at least one fourth symbol and the at least one fifth symbol as a solid symbol.

6. The system of claim 1, wherein the avionics display element includes at least one of a HDD, a HUD, a HMD, and a HWD.

7. The system of claim 1, wherein the controller is configured to detect the at least one stall condition based on at least one of:
    an angle of attack of the aircraft;
    a configuration of the aircraft; and
    an input received from the at least one avionics system.

8. The system of claim 1, wherein the controller is configured to:
    detect at least one near stall condition of the aircraft; and
    generate the one or more symbols in response to the detected near stall condition.

9. The system of claim 1, wherein the controller is configured to:
    detect at least one airspeed change of the aircraft; and
    in response to the detected airspeed change, modify the at least one fourth symbol.

10. An avionics display system, comprising:
    at least one display element configured to display one or more images associated with an aircraft;
    a controller configured to be coupled to the avionics display element and to at least one avionics system of the aircraft, the controller including at least one processor configured to
    detect at least one stall condition of the aircraft;
    detect an active status of at least one of an autopilot of the aircraft and an autothrottle of the aircraft;
    in response to the at least one stall condition, generate one or more symbols for display by the avionics display element, the one or more symbols including at least one of:
    a) a first symbol corresponding to the stall condition;
    b) a second symbol corresponding to the active status;
    c) a third symbol associated with at least one of a pitch correction of the aircraft and a roll correction of the aircraft; and
    d) a fourth symbol associated with a thrust correction of the aircraft;
    detect at least one of a pitch change of the aircraft and a roll change of the aircraft;
    in response to the detected pitch change or roll change, modify the at least one third symbol;
    detect at least one airspeed change of the aircraft; and
    in response to the detected airspeed change, modify the at least one fourth symbol;
    the avionics display element configured to generate at least one auditory alert associated with the stall condition.

11. The avionics display system of claim 10, wherein the avionics display element includes at least one of a HDD, a HUD, a HMD, and a HWD.

12. The avionics display system of claim 10, wherein the controller is configured to detect the at least one stall condition based on at least one of:
    an angle of attack of the aircraft;
    a configuration of the aircraft; and
    an input received from the at least one avionics system.

13. The method of claim 10, wherein detecting, via a controller of an avionics display system, at least one stall condition of an aircraft includes:
    detecting, via a controller of at least one of a HDD, a HUD, a HMD, and a HWD, at least one stall condition of an aircraft.

14. A method for providing stall recovery symbology, the method comprising:
    detecting, via a controller of an avionics display system, at least one stall condition of an aircraft;

detecting, via the controller, an active status of at least one of an autopilot of the aircraft and an autothrottle of the aircraft;

displaying, via the avionics display system, at least one first symbol corresponding to the stall condition;

displaying, via the avionics display system, at least one second symbol corresponding to the active status;

displaying, via the avionics display system, at least one third symbol associated with at least one of a pitch correction and a roll correction of the aircraft;

detecting, via the controller, at least one of a pitch change of the aircraft and a roll change of the aircraft; and in response to the detected pitch change or roll change, modifying, via the avionics display system, the at least one third symbol.

15. The method of claim 14, wherein detecting, via a controller of an avionics display system, at least one stall condition of an aircraft includes:

detecting, via a controller of an avionics display system, at least one stall condition of an aircraft based on at least one of
an angle of attack of the aircraft;
a configuration of the aircraft; and
an input received from an avionics system coupled to the controller.

16. The method of claim 14, wherein detecting, via a controller of an avionics display system, at least one stall condition of an aircraft includes:

detecting, via a controller of an avionics display system, at least one near-stall condition of an aircraft.

17. The method of claim 14, wherein displaying, via the avionics display system, at least one first symbol corresponding to the stall condition includes:

generating, via the avionics display system, at least one auditory warning associated with the stall condition.

18. The method of claim 14, wherein displaying, via the avionics display system, at least one third symbol associated with at least one of a pitch correction and a roll correction of the aircraft includes:

displaying, via the avionics display system, at least one third symbol associated with at least one of a desired pitch of the aircraft, a pitch correction for achieving the desired pitch, a desired roll of the aircraft, and a roll correction for achieving the desired roll.

19. The method of claim 14, wherein in response to the detected pitch change or roll change, modifying, via the avionics display system, the at least one third symbol includes:

in response to the detected pitch change or roll change, displaying, via the avionics display system, at least one fourth symbol associated with a thrust correction of the aircraft.

20. The method of claim 19, further comprising:

detecting, via the controller, at least one airspeed change of the aircraft;

in response to the detected airspeed change, modifying, via the avionics display system, the at least one fourth symbol.

* * * * *